March 18, 1969   G. W. MURRAY   3,433,330
SAFETY DEVICE FOR HYDRAULIC BRAKE SYSTEMS
Filed Dec. 15, 1967
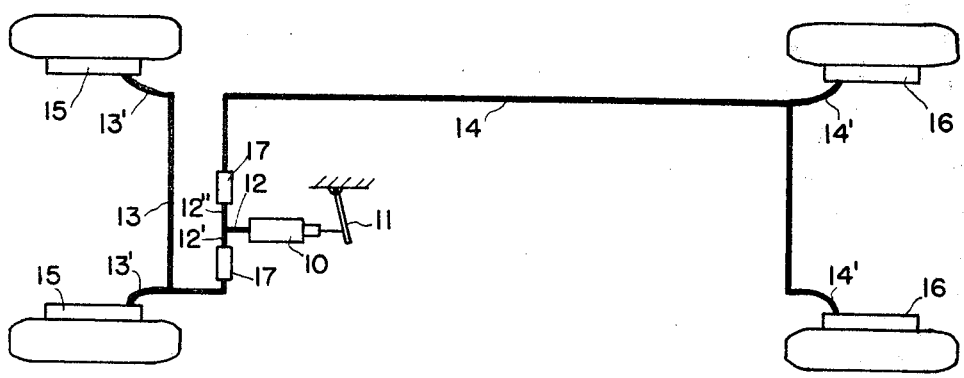
F I G. 1
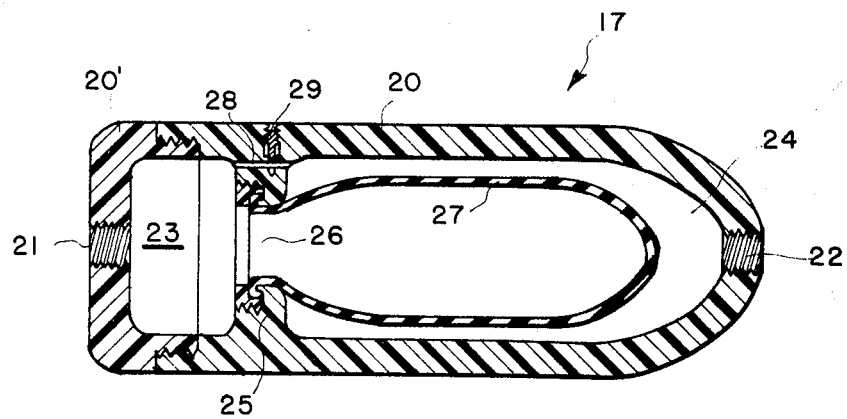
F I G. 2
INVENTOR.
GEORGE W. MURRAY
BY
*Peter L. Klempay*
AGENT

United States Patent Office 3,433,330
Patented Mar. 18, 1969

3,433,330
SAFETY DEVICE FOR HYDRAULIC BRAKE SYSTEMS
George W. Murray, Lowellville, Ohio, assignor of fifty percent to John L. Hinton, Youngstown, Ohio
Continuation-in-part of application Ser. No. 607,697, Jan. 6, 1967. This application Dec. 15, 1967, Ser. No. 690,907
U.S. Cl. 188—151   1 Claim
Int. Cl. B60t *11/10;* F15b *7/00*

ABSTRACT OF THE DISCLOSURE

A tubular cartridge having two chambers separated by a flexible diaphragm is connected, in series, to the conduits of a hydraulic brake system of a motor vehicle. The first chamber is connected to the conduit leading from the master cylinder and the second chamber is connected to the conduit leading to the brake cylinder. Under normal conditions pressure is transmitted from the fluid in the first chamber to the fluid in the second chamber by the diaphragm. If a leak occurs in the conduit leading from the cartridge or in the brake cylinder, the diaphragm is restrained by the cartridge walls and the remainder of the brake system remains operative. A needle valve is provided for bypassing the diaphragm to permit air to be bled from the system.

Specification

This is a continuation-in-part of Ser. No. 607,697, filed Jan. 6, 1967, and now abandoned.

This invention relates to safety devices for hydraulic brake systems such as those used on automobiles wherein there is provided a pedal operated master cylinder connected to a brake cylinder associated with each of the road-engaging wheels of the vehicle, and more particularly to a device which, in the event one brake line is ruptured, maintains adequate operating pressure in the remaining lines.

It has been proposed to equip automobiles with a second master cylinder, one master cylinder being used to operate the brakes of a the front wheels of the vehicle and the other to operate the brakes of the rear wheels. While this system does provide an additional safety factor, it is costly and not readily adaptable to existing vehicles. Numerous other devices have been proposed to prevent total loss of braking in the event one brake fails but these involve costly, precision units and, in many cases, require extensive modifications of the brake systems of existing equipment.

It is the primary object of my invention to provide a safety device for use with a hydraulic brake system which is readily installed on new or existing equipment and which provides reliable and trouble-free operation. A further object of my invention is the provision of such a device which is characterized by its simplicity and economy of construction. The above and other objects and advantages of my invention will become apparent upon consideration of the following specification and the accompanying drawing wherein there is disclosed a preferred embodiment of the invention.

In the drawing:

FIGURE 1 is a schematic view of the brake system of an automobile or the like equipped with the device of my invention; and FIGURE 2 is a longitudinal sectional view of the safety device of my invention.

Referring first to FIGURE 1, reference numeral 10 designates the master cylinder of the system which is operated by means of a pedal 11 in a manner well known in the art. A conduit 12 leads from the master cylinder and bifurcates into a first conduit 12' leading to the front wheel brakes of the vehicle and a second conduit 12" leading to the rear wheel brakes of the vehicle. The conduit 12' is joined to the cylinders of the front wheel brakes 15 by flexible condiuts 13 and the conduit 12" is joined to the cylinders of the rear wheel brakes 16 by flexible conduits 14. The flexible conduits 13 and 14 are of necessity located at a vulnerable position and are the most likely portions of the conduit system to be damaged. In order to prevent complete loss of braking in the event of the conduits is ruptured or damaged, I provide a pair of cartridges 17, to be more fully described hereinafter, which are effective to maintain pressure in either conduit 12' or conduit 12" in the event pressure is lost in the other of the conduits.

Referring now to FIGURE 2 the safety device 17 of my invention will now be described in detail.

I provide a cylindrical cartridge 20 having an end cap 20', an inlet connection 21, and an outlet connection 22, One of the conduits 12' or 12" is connected to the connection 21 and the conduit 13 or 14 is connected to the connection 22. The port 21 communicates with a first interior chamber 23 and the port 22 a second interior chamber 24. A wall 25 having an annular opening 26 concentric about the longitudinal axis of the cartridge 20 separates chambers 23 and 24. A flexible diaphragm 27 is secured to the wall 25 and extends through the annular opening 26 into the second chamber 24. A small port 28 also extends through the wall 25 interconnecting the chamber 23 and that portion of the chamber 24 which is outside of the diaphragm 27. A needle valve 29 is provided which closes the port 28 thus separating the chambers 23 and 24 from one another.

When the cartridge 17 is installed in the brake system of a vehicle the needle valve 29 is opened and the brakes are bled in the usual manner thus drawing fluid from the master cylinder through the port 21 filling the chamber 23, thence through the port 28 filling the chamber 24, and thereafter filling the conduits 13 and 14 and the cylinders of the wheel brakes. When the system has been filled with hydraulic fluid, the needle valve 29 is closed. The normal operation pressure from the master cylinder is transmitted through conduit 12' or conduit 12" to the fluid in chamber 23 thence through diaphragm 27 to the fluid in chamber 24 and to the brakes of the vehicle. If a leak should occur in any portion of the conduits or cylinders remote from the master cylinder, fluid will be lost in that portion of the system. However, the diaphragm 27 will be restrained by the inner surface of the cartridge 20 and braking ability may be maintained in the remaining portion of the system. Thus, for example, if a rupture occurs in one of the conduits 13' the diaphragm 27 of the cartridge 17 in the conduit 12' will be restrained from motion and working pressure will be maintained in the conduits 12" and 14 and the rear brakes of the vehicle will still be operative.

It is contemplated that the cartridges 20 of my system may be made of a hard transparent material and as these cartridges may be mounted in a readily visible location, on the upper portion of the firewall, for example, any malfunctions of the brake system may be readily seen by observing the cartridges. If, for example, one of the brake cylinders of the vehicle developes a slow leak this may be readily seen well before complete loss of braking occurs. In such an event the gradual loss of fluid by the leaking cylinder will cause the diaphragm of the cartridge which is associated with the conduits feeding that cylinder to be further extended than the diaphragm of the other cartridge. Likewise, the presence of air or dirt in the brake fluid can be easily detected by this visual inspection.

It will be apparent that changes may be made in and to the device of my invention.

I claim:

1. In a hydraulic brake system for a motor vehicle having a pedal operated master cylinder, braking means associated with each of the road-engaging wheels of the vehicle, hydraulic cylinders operating said braking means, a first conduit means connecting said master cylinder to the cylinders of the front wheel brakes, and a second conduit means connecting said master cylinder to the cylinders of the rear wheel brakes, the improvement comprising: a hollow cartridge closed at its ends, said cartridge having a first port connecting with the conduit means leading from said master cylinder and a second port connecting with the conduit means leading to said brake operating cylinders, said cartridge having an interior wall dividing the interior of said cartridge into first and second chambers, said first port leading into said first chamber and said second port leading into second chamber, said wall having an opening interconnecting said first and second chambers; an extensible, impervious diaphragm secured to said wall and extending through said opening and into said second chamber; said wall also having a second opening extending from said first chamber to the portion of said second chamber external to said diaphragm, and a valve operative to open and close said second opening.

References Cited

UNITED STATES PATENTS

| | | |
|---|---|---|
| 2,246,621 | 6/1941 | Davis. |
| 2,624,176 | 1/1953 | Osborne _____ 60—54.5 |

GEORGE E. A. HALVOSA, *Primary Examiner.*

U.S. Cl. X.R.

60—54.5